United States Patent
Subramanian et al.

(10) Patent No.: US 12,252,873 B2
(45) Date of Patent: *Mar. 18, 2025

(54) TOUCHLESS FAUCET

(71) Applicant: B/E AEROSPACE, INC., Winston Salem, NC (US)

(72) Inventors: Sanith Kurumpilavu Subramanian, Bangalore (IN); Raja Mandava, Bangalore (IN); Vishwanand Vishwannathan, Bangalore (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/833,716

(22) Filed: Jun. 6, 2022

(65) Prior Publication Data

US 2023/0062387 A1 Mar. 2, 2023

(30) Foreign Application Priority Data

Sep. 2, 2021 (IN) .............. 202141039811

(51) Int. Cl.
| | | |
|---|---|---|
| *E03C 1/05* | (2006.01) | |
| *B64D 11/02* | (2006.01) | |
| *E03C 1/02* | (2006.01) | |
| *E03C 1/04* | (2006.01) | |
| *E03C 1/048* | (2006.01) | |

(52) U.S. Cl.
CPC .............. *E03C 1/057* (2013.01); *B64D 11/02* (2013.01); *E03C 1/0404* (2013.01); *E03C 1/048* (2013.01); *E03C 2001/026* (2013.01)

(58) Field of Classification Search
None
See application file for complete search history.

(56) References Cited

U.S. PATENT DOCUMENTS

| | | |
|---|---|---|
| 8,572,772 B2 | 11/2013 | Wolf et al. |
| 8,807,521 B2 | 8/2014 | Dunki-Jacobs et al. |
| 10,036,150 B2 | 7/2018 | Yan et al. |
| 2011/0186154 A1 | 8/2011 | Klicpera |
| 2016/0177551 A1* | 6/2016 | Li ..................... G01R 33/07 324/251 |
| 2016/0362876 A1* | 12/2016 | Mainka ............. E03C 1/04 |

FOREIGN PATENT DOCUMENTS

| | | | |
|---|---|---|---|
| EP | 3736386 | 11/2020 | |
| EP | 3736386 A1 * | 11/2020 | |
| WO | 2013185222 | 12/2013 | |
| WO | WO-2013185222 A1 * | 12/2013 | ........... F16K 3/24 |

OTHER PUBLICATIONS

European Patent Office, European Search Report dated Jul. 5, 2023 in Application No. 22189408.2.

* cited by examiner

*Primary Examiner* — Christine J Skubinna
(74) *Attorney, Agent, or Firm* — SNELL & WILMER L.L.P.

(57) ABSTRACT

A touchless faucet for an aircraft lavatory may comprise a faucet housing and an electrically controlled valve assembly located in the faucet housing. The electrically controlled valve assembly may be configured to control a flow of fluid to a primary outlet of the faucet housing. A manual actuation assembly may be located in the faucet housing. The manual actuation assembly may be configured to control the flow of fluid to a secondary outlet of the faucet housing.

15 Claims, 16 Drawing Sheets

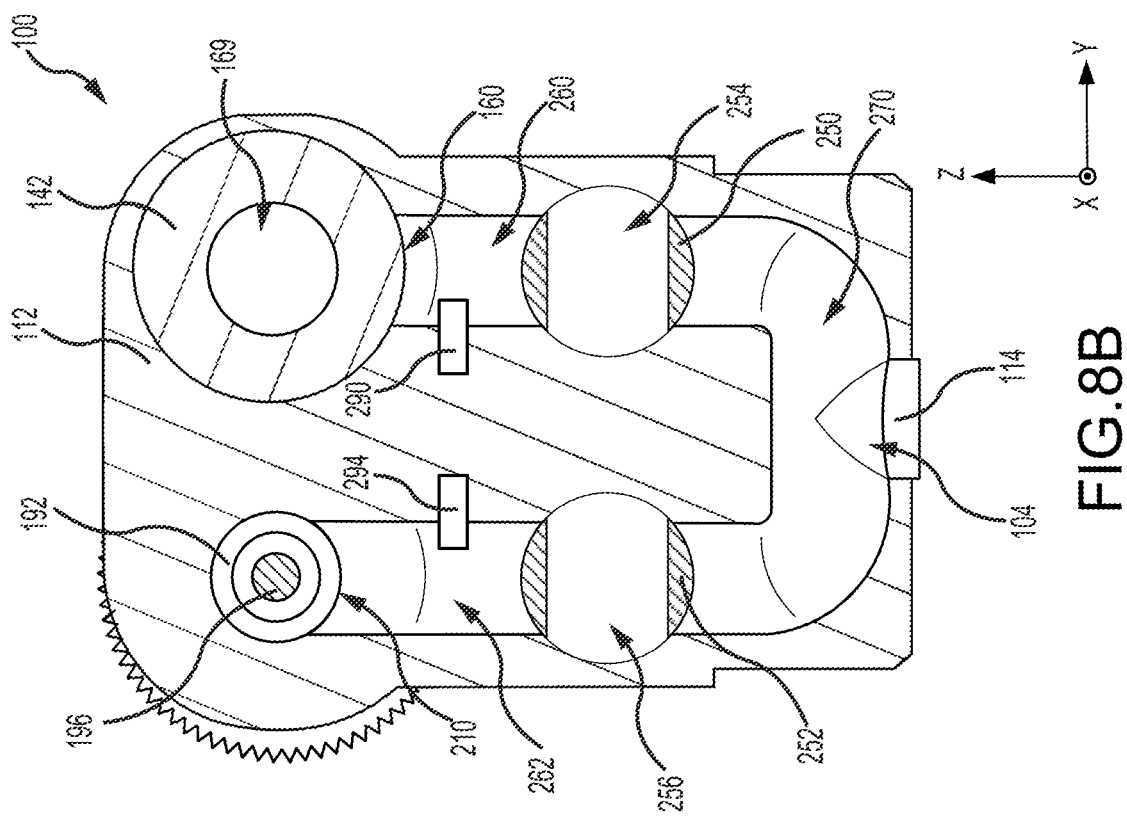
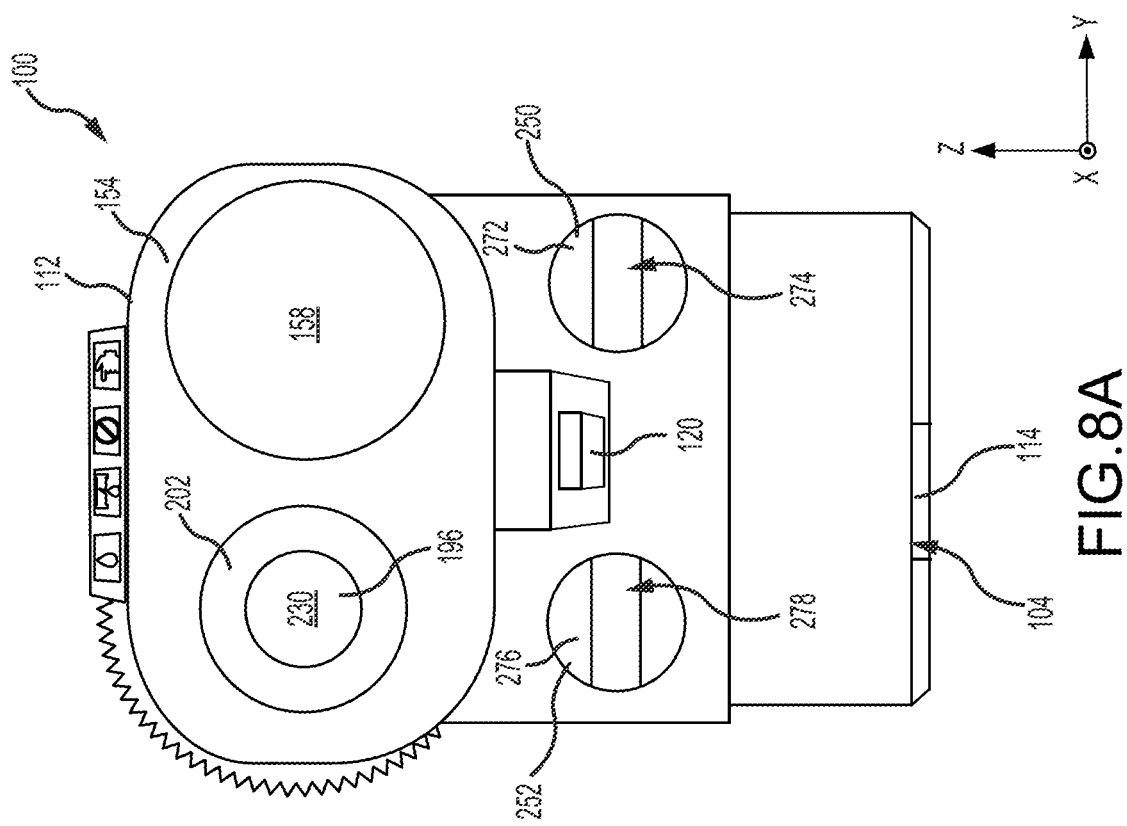

TOUCHLESS FAUCET

CROSS-REFERENCE TO RELATED APPLICATIONS

This application claims priority to, and the benefit of, India Patent Application No. 202141039811, filed Sep. 2, 2021 (DAS Code E46F) and titled "TOUCHLESS FAUCET," which is incorporated by reference herein in its entirety for all purposes.

FIELD

The present disclosure relates to faucets and, in particular, to touchless faucets.

BACKGROUND

Aircraft lavatory faucets provide potable water for handwashing. Touchless lavatory faucets may be configured to provide water (e.g., actuate a faucet valve) in response to a user locating his/her hands under the faucet aerator. Leakage between the potable water source and the faucet and/or leakage from the faucet can waste the limited about of potable water available and can cause water damage to other aircraft structures.

SUMMARY

A touchless faucet is disclosed herein. In accordance with various embodiments, the touchless faucet may comprise a faucet housing defining an inlet, a main fluid chamber defined by the faucet housing, and a solenoid valve assembly located in a solenoid chamber. The solenoid chamber may be located in a first portion of the faucet housing. A primary outlet is formed in the first portion of the faucet housing. The solenoid valve assembly is configured to control a flow of fluid to the primary outlet. A manual actuation assembly may be located in a second portion of the faucet housing. A secondary outlet is formed in the second portion of the faucet housing. The manual actuation assembly is configured to control the flow of fluid to the secondary outlet.

In various embodiments, the solenoid valve assembly may comprise a poppet configured to translate along a longitudinal poppet axis, a biasing member configured to bias the poppet toward the primary outlet, and a solenoid coil configured to generate a magnetic field.

In various embodiments, the poppet may define a fluid channel. In various embodiments, when the solenoid valve assembly is in an open position, the fluid channel defined by the poppet fluidly connects the main fluid chamber and the primary outlet. In various embodiments, the faucet housing may define a fluid passageway fluidly connecting the main fluid chamber and the solenoid chamber. When the solenoid valve assembly is in the open position, an inlet of the fluid channel defined by the poppet aligns with an outlet of the fluid passageway.

In various embodiments, the manual actuation assembly includes a plunger biased toward a front end of the touchless faucet. In various embodiments, the manual actuation assembly includes a damper assembly operably coupled to the plunger. In various embodiments, when the manual actuation assembly is in a closed position, the plunger forms a sealing interface with a wall of the faucet housing.

In various embodiments, when the manual actuation assembly is in an open position, the plunger overlaps a fluid passageway fluidly connecting the main fluid chamber and the solenoid chamber. In various embodiments, at least one of a flow rate sensor or a water presence sensor may be located in the main fluid chamber.

In various embodiments, a primary outlet water presence sensor may be located downstream of the primary outlet. A secondary outlet water presence sensor may be located downstream of the secondary outlet. In various embodiments, a primary knob valve may be located downstream of the primary outlet water presence sensor. The primary knob valve may be configured to control the flow of fluid between the primary outlet and a main outlet chamber. A secondary knob valve may be located downstream of the secondary outlet water presence sensor. The secondary knob valve may be configured to control the flow of fluid between the secondary outlet and the main outlet chamber.

In accordance with various embodiments, a touchless faucet may comprise a faucet housing, a solenoid valve assembly located in the faucet housing, and a primary outlet formed in a first portion of the faucet housing. The solenoid valve assembly is configured to control a flow of fluid to the primary outlet. A manual actuation assembly may be located in the faucet housing. A secondary outlet may be formed in a second portion of the faucet housing. The manual actuation assembly is configured to control the flow of fluid to the secondary outlet.

In various embodiments, a primary valve channel is fluidly connected to the primary outlet. A secondary valve channel is fluidly connected to the secondary outlet. A main outlet channel is downstream of the primary valve channel and the secondary valve channel.

In various embodiments, a primary knob valve is located between the primary outlet and the main outlet channel. A secondary knob valve is located between the secondary outlet and the main outlet channel.

In various embodiments, a primary actuator is rotationally coupled to the primary knob valve. A secondary actuator is rotationally coupled to the secondary knob valve. In various embodiments, a primary outlet water presence sensor is located downstream of the primary outlet. A secondary outlet water presence sensor is located downstream of the secondary outlet.

A touchless faucet for an aircraft lavatory is also disclosed herein. In accordance with various embodiments, the touchless faucet comprises a faucet housing and an electrically controlled valve assembly located in the faucet housing. The electrically controlled valve assembly is configured to control a flow of fluid to a primary outlet of the faucet housing. A manual actuation assembly is located in the faucet housing. The manual actuation assembly is configured to control the flow of fluid to a secondary outlet of the faucet housing.

In various embodiments, a clamping coupler may be coupled to an inlet of the faucet housing. The clamping coupler may comprise a central body having a plurality of flanges and a conduit located within the central body. A distance between the conduit and flanges may increase toward a terminal end of the flanges. A nut is configured to form a threaded engagement with the plurality of flanges. Translation of the nut toward the terminal end of the plurality of flanges may force the plurality of flanges radially inward and toward the conduit.

In various embodiments, the electrically controlled valve assembly comprises a solenoid valve assembly, and the manual actuation assembly includes a plunger biased toward a front end of the touchless faucet and a damper assembly operably coupled to the plunger.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 8A and 8B illustrate a front view and a cross section view, respectively, of a touchless faucet having the primary and secondary knob valves in a closed state, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of clarity.

Disclosed herein, according to various embodiments, is a touchless faucet. Although details and examples are included herein pertain to implementing the touchless faucet in an aircraft lavatory, the present disclosure is not necessarily so limited, and thus aspects of the disclosed embodiments may be adapted for performance in a variety of other industries. As such, numerous applications of the present disclosure may be realized.

Figure 1:
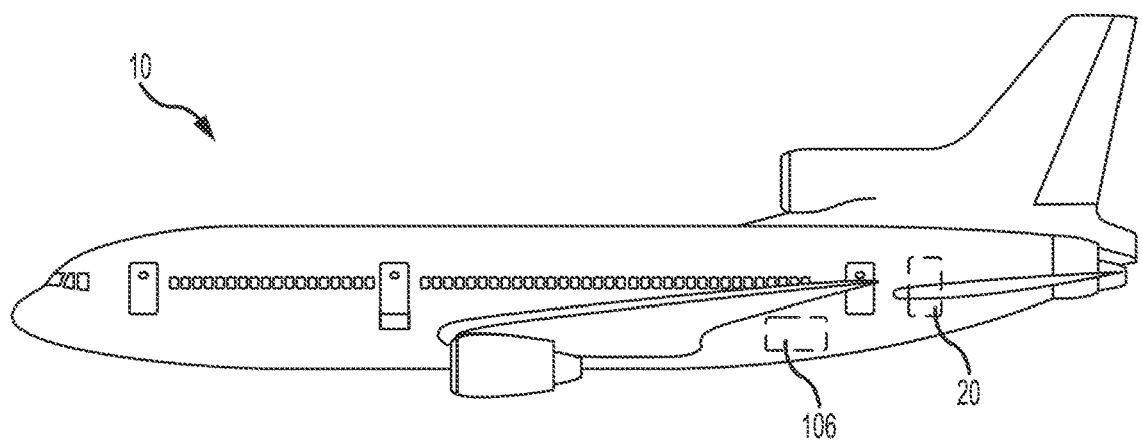
FIG. 1 illustrates an aircraft, in accordance with various embodiments.
Figure 2:
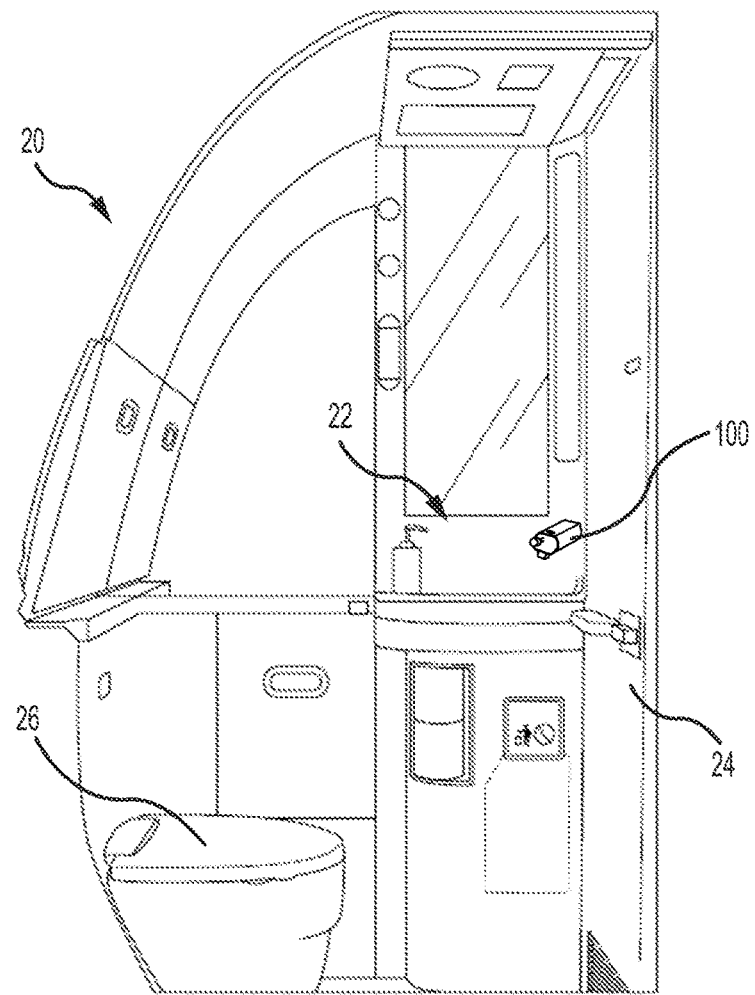
FIG. 2 illustrates an aircraft lavatory having a touchless faucet, in accordance with various embodiments.

In various embodiments, and with reference to FIGS. 1 and 2, an aircraft 10 may include aircraft lavatory 20. The aircraft lavatory 20 may include a washbasin (e.g., a sink) 22, a door 24, and a toilet 26, among other features. The washbasin 22 includes a touchless faucet 100.

Figure 3A:
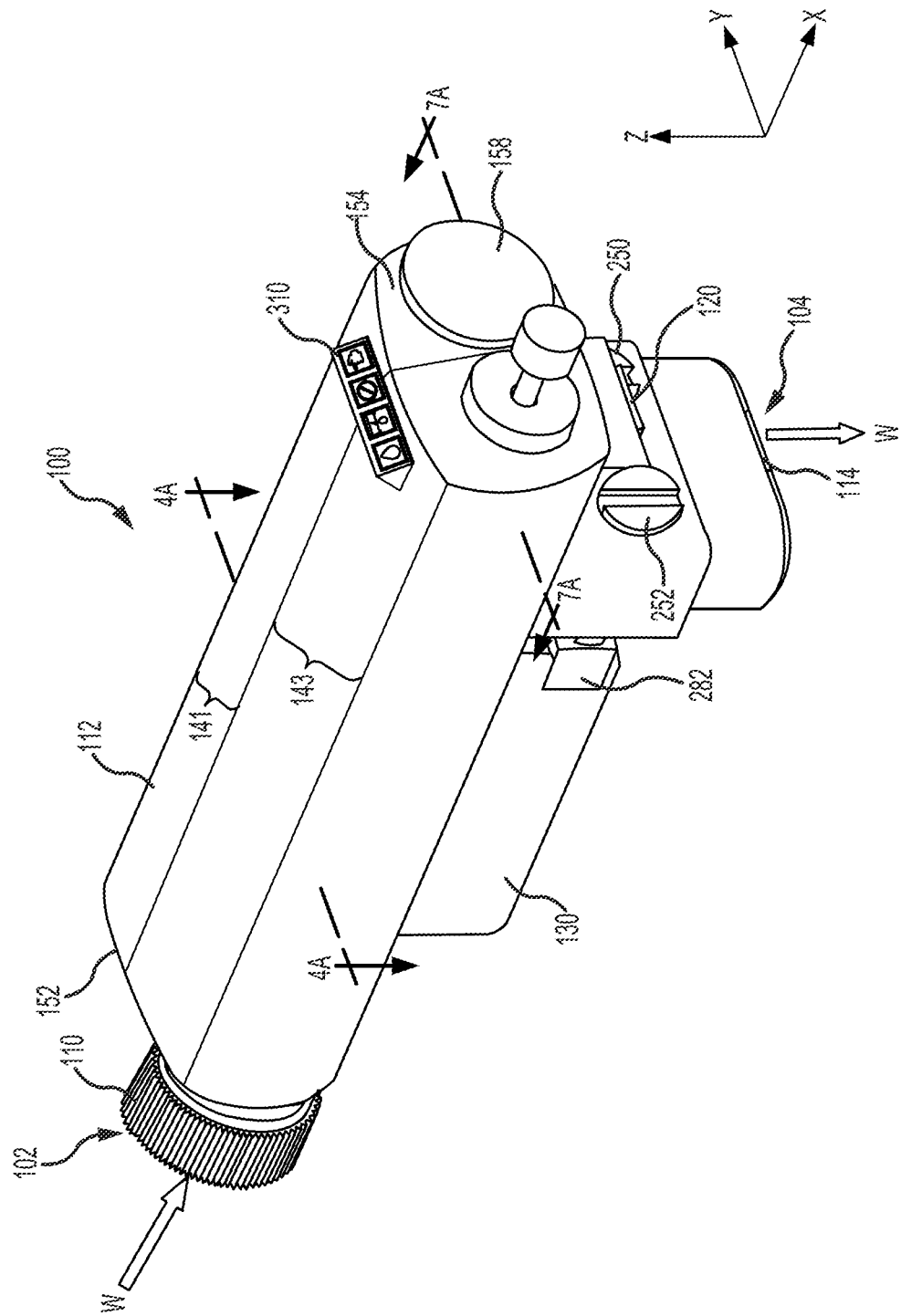
FIGS. 3A and 3B illustrate a perspective view and a side view, respectively, of a touchless faucet, in accordance with various embodiments.
Figure 3B:
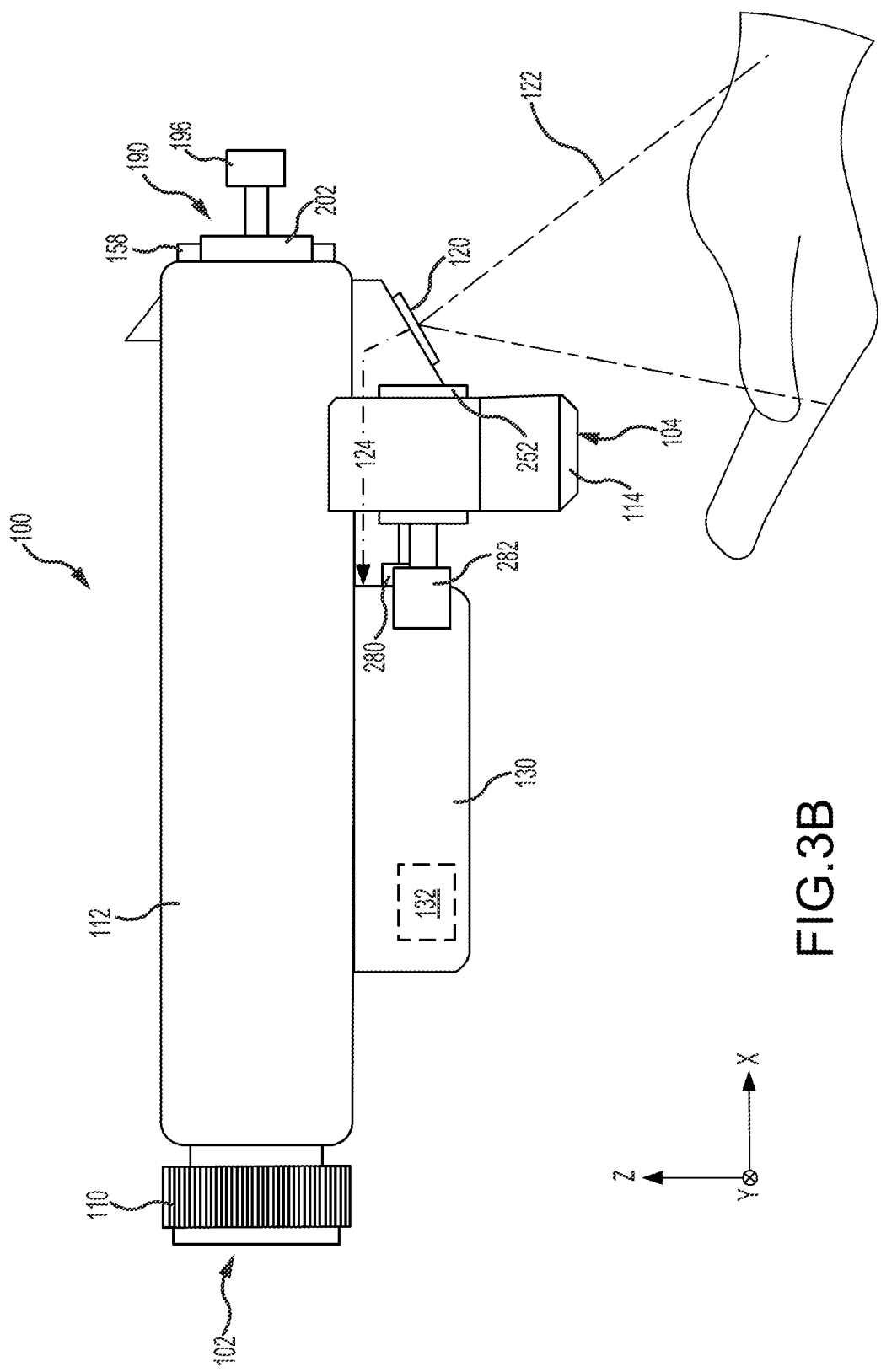

With reference to FIGS. 3A and 3B, a perspective view and a side view, respectively, of touchless faucet 100 (hereinafter "faucet 100") are illustrated. In accordance with various embodiments, faucet 100 includes an inlet 102 and an outlet 104. Faucet 100 may receive water from a potable water source 106 (FIG. 1) located on aircraft 10. Faucet 100 receives water via inlet 102 and outputs the water via outlet 104. In various embodiments, a faucet housing 112 may define inlet 102. In various embodiments, a coupler 110 may be coupled to faucet 100 at inlet 102. Coupler 110 may be coupled to faucet housing 112 at inlet 102. Outlet 104 may include an aerator 114 coupled to faucet housing 112. Coupler 110 includes central body 116 and a sleeve 118. With momentary reference to FIG. 4A, coupler 110 may be coupled to faucet housing 112 via a threaded engagement between a threaded outer circumferential surface 217 of central body 116 and a threaded surface 113 of faucet housing 112. Sleeve 118 may include a threaded inner circumferential surface 119. Coupler 110 may be fluidly coupled to a potable water supply line (e.g., a conduit fluidly connect to potable water source 106 (FIG. 1), via a threaded engagement with a threaded inner circumferential surface 219 of sleeve 118. In this regard, coupler 110 may be configured to allow faucet 100 to be fluidly coupled to current potable water supply lines.

Returning to FIGS. 3A and 3B, in accordance with various embodiments, faucet 100 includes a proximity sensor 120. Proximity sensor 120 is configured to detect objects located under outlet 104. Stated differently, proximity sensor 120 detects object (e.g., a hand) located in a field of view 122 (FIG. 3B) of proximity sensor 120. Proximity sensor 120 may be an inductive proximity sensor, an optical proximity sensor, and capacitive proximity sensor, an ultrasonic proximity sensor, or any other suitable proximity sensor. In various embodiments, proximity sensor 120 is an infrared proximity sensor.

Faucet 100 further includes a controller 130. Controller 130 is operably coupled to proximity sensor 120. In this regard, controller 130 receives target detection signals 124 from proximity sensor 120. Controller 130 may include a general-purpose processor, a digital signal processor (DSP), an application specific integrated circuit (ASIC), a field programmable gate array (FPGA), or some other programmable logic device, discrete gate or transistor logic, discrete hardware components, or any combination thereof. A tangible, non-transitory computer-readable storage medium 132 may be in communication with controller 130. The storage medium 132 may comprise any tangible, non-transitory computer-readable storage medium known in the art. The storage medium 132 has instructions stored thereon that, in response to execution by controller 130 cause controller 130 to perform operations related to controlling faucet 100.

Figure 4A:
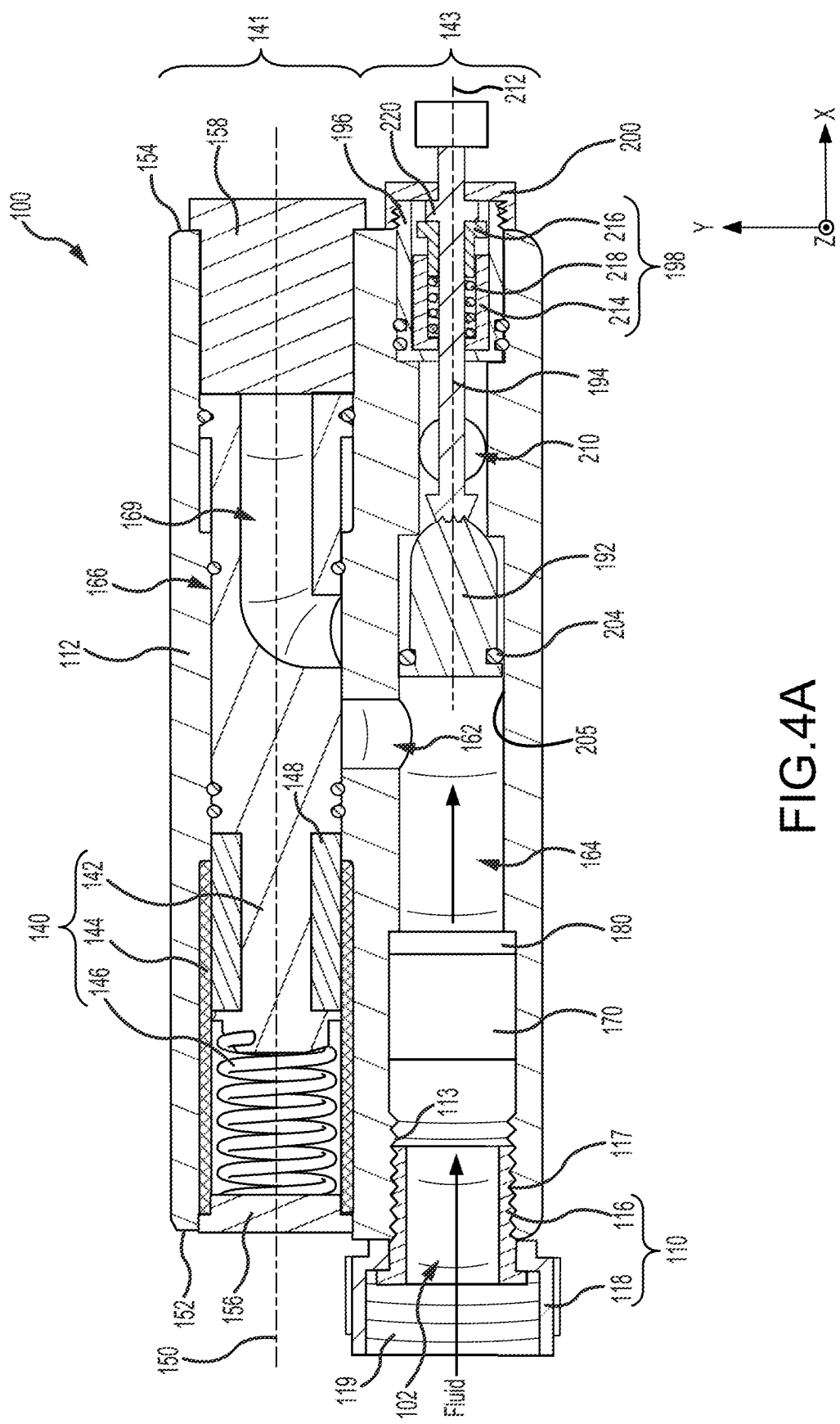
FIG. 4A illustrates a cross section view of a touchless faucet in a fully closed position, in accordance with various embodiments.
Figure 4B:
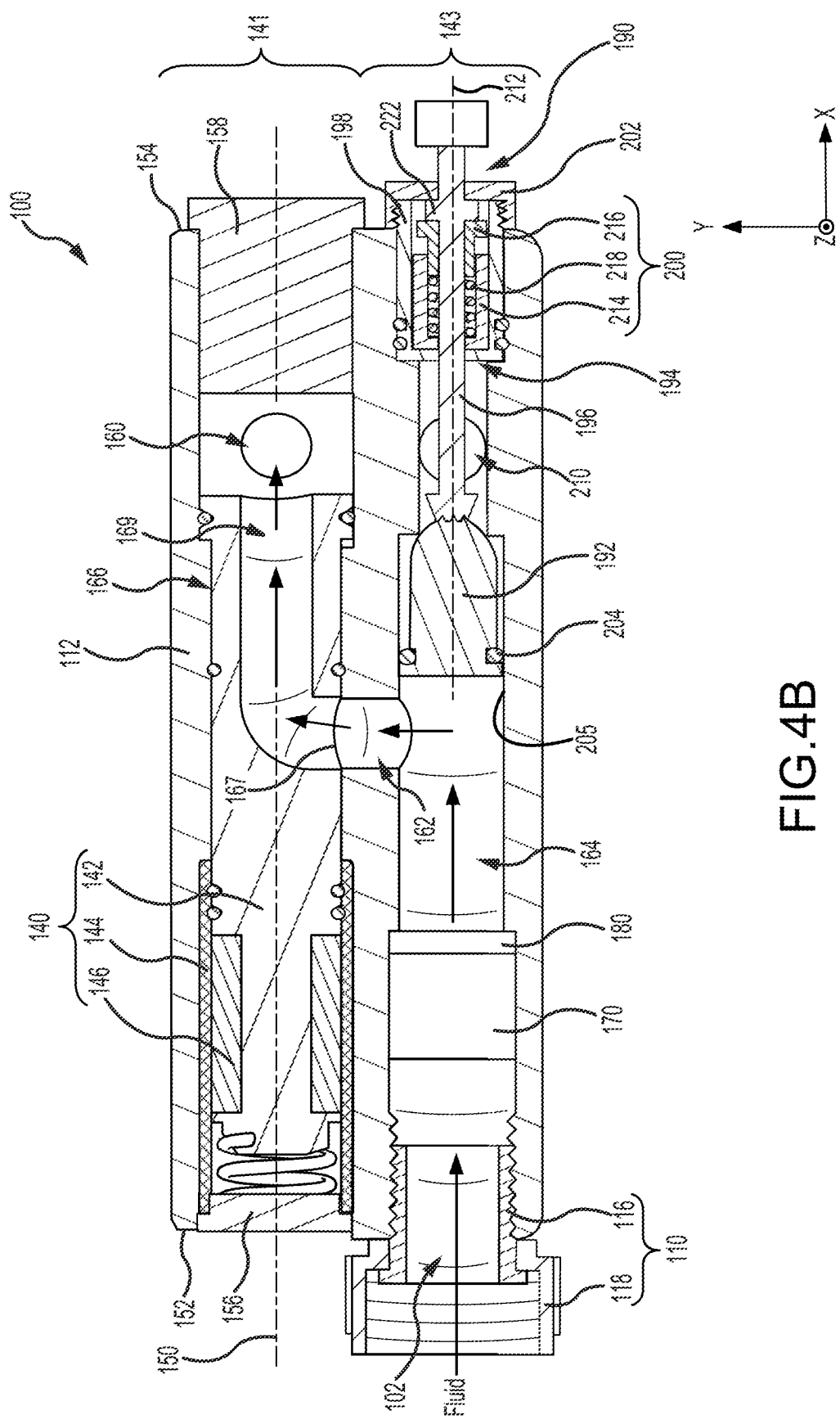
FIG. 4B illustrates a cross section view of a touchless faucet with the electrically controlled flow path in an open position, in accordance with various embodiments.
Figure 4C:
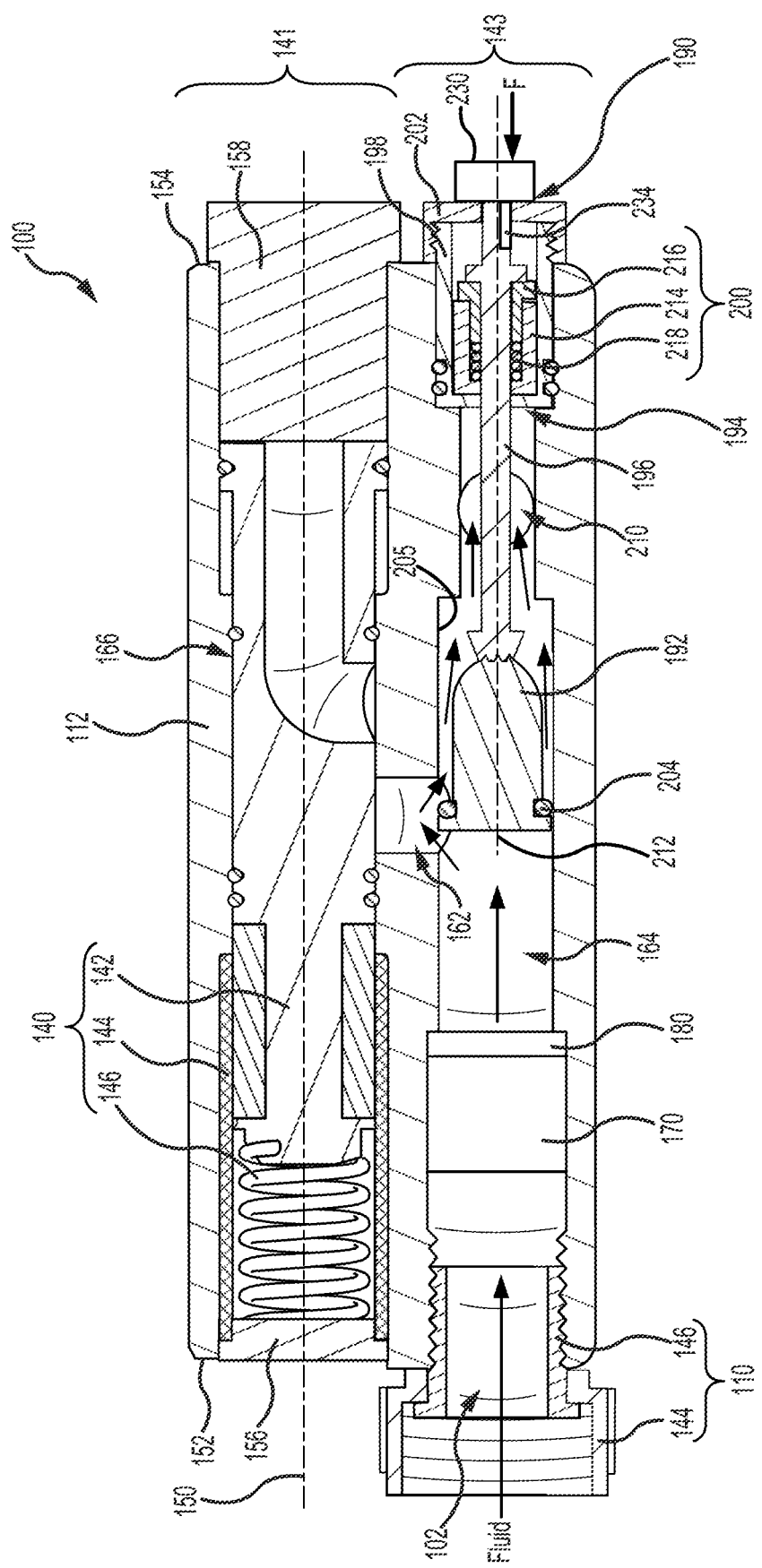
FIG. 4C illustrates a cross section view of a touchless faucet with the manual flow path in an open position, in accordance with various embodiments.

FIGS. 4A, 4B, and 4C illustrate a cross-section view of faucet 100 taken along the line 4A-4A in FIG. 3A. With combined reference to FIG. 3A and FIG. 4A, controller 130 is configured to control water output from faucet 100 via a solenoid valve assembly 140 located in a first portion 141 of faucet housing 112. Referring now to FIG. 4A, solenoid valve assembly 140 includes a poppet 142, a solenoid coil 144, and a biasing member 146. In various embodiments, a spool 148 may be located around poppet 142. At least a portion of poppet 142 and/or spool 148 is magnetic. For example, poppet 142 may be magnetic (e.g., formed of a ferrous material), with spool 148 being made from non-magnetic materials. In various embodiments, spool 148 may be magnetic (e.g., formed of a ferrous material), and poppet 142 may be non-magnetic. In various embodiments, both poppet 142 and spool 148 are magnetic. Poppet 142 translates along a longitudinal, or linear translation, axis 150 (referred to herein as longitudinal poppet axis 150) during operation/actuation of solenoid valve assembly 140.

In accordance with various embodiments, solenoid coil 144 is wrapped helically around longitudinal poppet axis 150. Solenoid coil 144 is electrically connected to controller 130. Controller 130 is configured to control the current and/or voltage provided to solenoid coil 144. Applying current to the solenoid coil 144 generates a magnetic field. With additional reference to FIG. 4B, the magnetic field generated by solenoid coil 144 magnetically induces movement of poppet 142 toward biasing member 146 and a back (or first) end 152 of faucet housing 112. Stated differently, the magnetic field generated by solenoid coil 144 translates solenoid valve assembly 140 from the closed position (FIG. 4A) to the open position (FIG. 4B). Translation of poppet 142 toward back end 152 compresses biasing member 146. Biasing member 146 is configured to bias poppet 142 away from back end 152 of faucet housing 112 and toward a front (or second) end 154 of faucet housing 112. Front end 154 of faucet housing 112 is opposite back end 152 of faucet housing 112.

In various embodiments, solenoid chamber 166 is located in first portion 141 of faucet housing 112, and main fluid chamber 164 is located in a second portion 143 of faucet housing 112. Main fluid chamber 164 receives water from inlet 102 and is located upstream of solenoid chamber 166.

In various embodiments, a first end stop 156 may be coupled to first portion 141 at back end 152. A second end stop 158 may be coupled to first portion 141 at front end 154. When solenoid valve assembly 140 is in the closed position, as shown in FIG. 4A, poppet 142 is located over a primary outlet 160 (FIG. 4B). In various embodiments, when solenoid valve assembly 140 is in the closed position, poppet 142 may contact second end stop 158. When solenoid valve assembly 140 is in the closed position, poppet 142 blocks a fluid passage 162 formed between a main fluid chamber 164 and a solenoid chamber 166 of faucet housing 112.

When solenoid valve assembly 140 is in the open position, an inlet 167 of a fluid channel 169 formed in poppet 142 is aligned with fluid passage 162 in faucet housing 112. Stated differently, when solenoid valve assembly 140 is in the open position, the fluid channel 169 defined by poppet 142 is fluidly connected to fluid passage 162 in faucet housing 112. In this regard, when solenoid valve assembly 140 is in the open position, fluid (e.g., water) may flow through inlet 102, into main fluid chamber 164, through fluid passage 162, through fluid channel 169, and into primary outlet 160. As described in further detail below, primary outlet is fluidly coupled to outlet 104 (FIG. 3A) of faucet 100.

Figure 5:
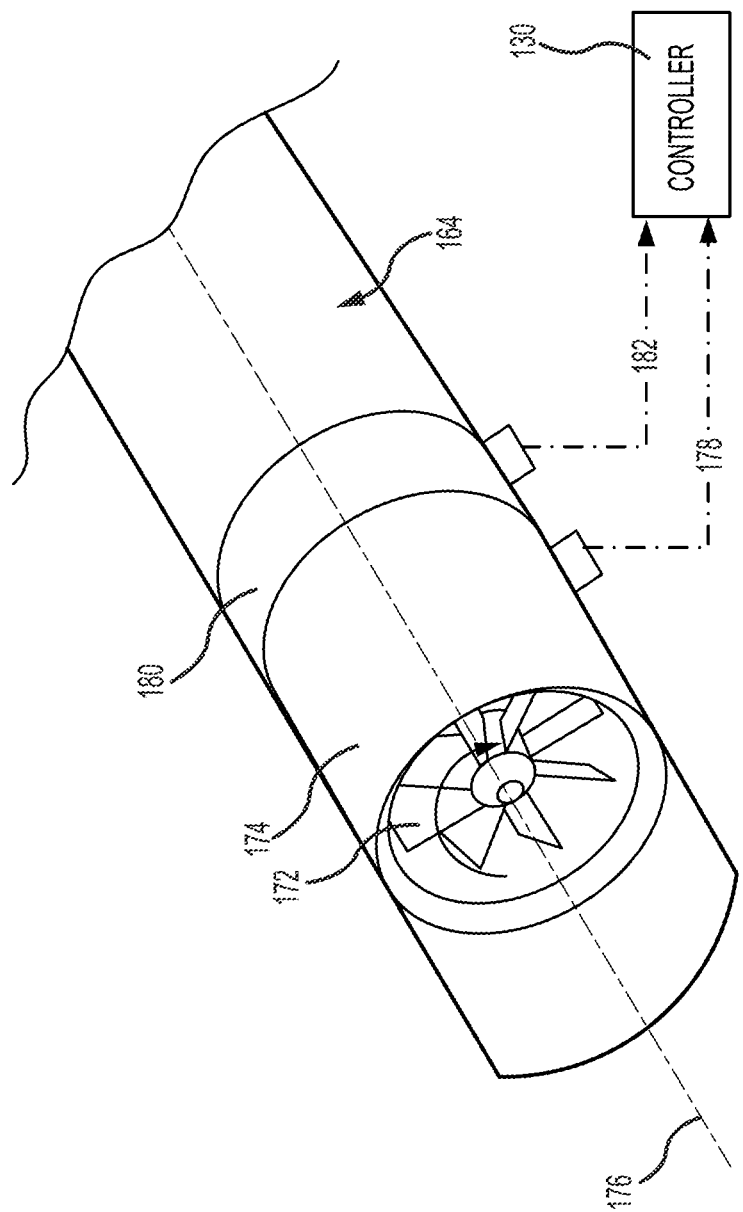
FIG. 5 illustrates a flow rate sensor and a water presence sensor of a touchless faucet, in accordance with various embodiments.

In various embodiments, a flow rate sensor 170 is located in main fluid chamber 164. Flow rate sensor 170 is configured to determine a flow rate (e.g., a volume of liquid per unit time) of fluid through main fluid chamber 164. For example, with reference to FIG. 5, in various embodiments, flow rate sensor 170 may include a paddle wheel 172 located in a sensor casing 174. Paddle wheel 172 is configured to rotate about a wheel axis 176 in response to fluid (e.g., water from inlet 102) flowing through flow rate sensor 170. Flow rate sensor 170 outputs flow rate signals 178 to controller 130. Flow rate signals 178 may correspond to the revolutions per minute (RPM) of paddle wheel 172. Flow rate signals 178 may be sent via a wired or wireless connection to controller 130.

In various embodiments, a main chamber water presence sensor 180 is located in main fluid chamber 164. Main chamber water presence sensor 180 is configured to detect a of water in main fluid chamber 164. Main chamber water presence sensor 180 outputs main chamber water presence signals 182 to controller 130. Main chamber water presence signals 182 may be sent via a wired or wireless connection to controller 130.

Figure 6:
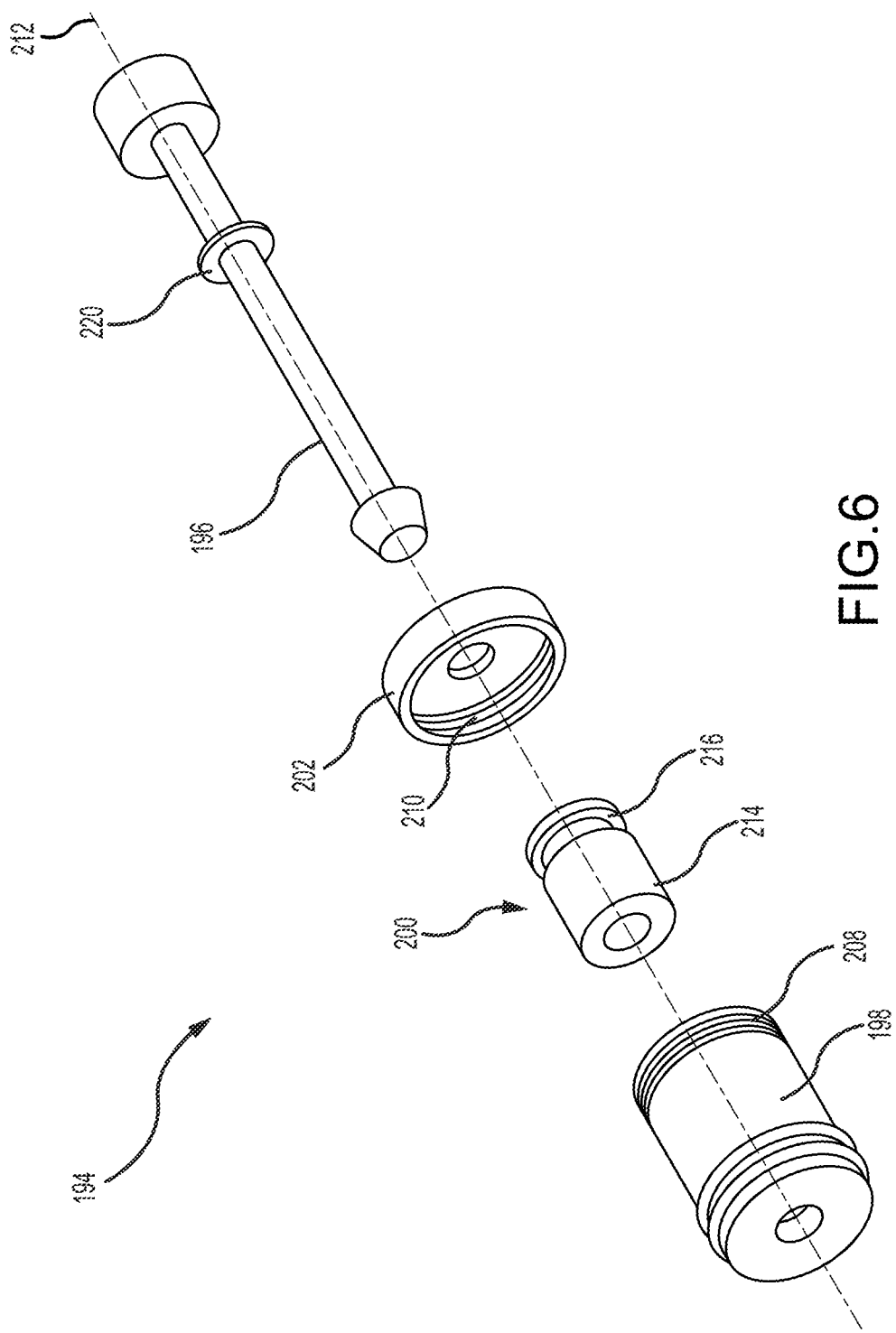
FIG. 6 illustrates an assembly view of a damper assembly for a touchless faucet, in accordance with various embodiments.

Returning to FIG. 4A, in accordance with various embodiments, faucet 100 includes a manual actuation assembly 190. Manual actuation assembly 190 is located in second portion 143 (FIG. 3A) of faucet housing 112. With combined reference to FIG. 4A and FIG. 6, in various embodiments, manual actuation assembly 190 may include a plunger 192 and a damper assembly 194 configured to translate the plunger 192 within main fluid chamber 164. Damper assembly 194 includes a rod 196, a housing 198, a damper 200, and a cap 202. Plunger 192 is located in main fluid chamber 164. When manual actuation assembly is in the closed state, as shown in FIGS. 4A and 4B, plunger 192 forms a sealing interface with faucet housing 112. In various embodiments, plunger 192 includes a seal 204. Seal 204 may be located around an outer circumference of plunger 192. Seal 204 may comprise a resilient, elastomeric material such as, for example, rubber, synthetic rubber, silicone, and/or the like. In this regard, seal 204 may deform in response to contact with faucet housing 112. For example, seal 204 and/or plunger 192 may contact and form a sealing interface with the faucet housing wall 205 that defines main fluid chamber 164. When manual actuation assembly 190 is in the closed state, plunger 192 and/or seal 204 block, or otherwise prevent, fluid from flowing to a secondary outlet 210 formed in faucet housing 112.

Rod 196 may be coupled to plunger 192, such that translation of rod 196 translates plunger 192 within main fluid chamber 164. Rod 196 and plunger 192 translate along a longitudinal, or linear translation, axis 212 during operation/actuation of manual actuation assembly 190. Rod 196 extends through housing 198, damper 200, and cap 202. Housing 198 may be coupled to cap 202 via threaded engagement between a threaded outer circumferential surface 206 of housing 198 and a threaded inner circumferential surface 208 of cap 202. Damper 200 may be located in housing 198. Damper 200 includes an outer cylinder 214, a piston 216 configured to telescope/translate relative to outer cylinder 214, and a biasing member 218. Rod 196 may include a flange 220. Flange 220 generates an interference surface with piston 216, such that translation of rod 196 translates piston 216 into outer cylinder 214 (e.g., in a first direction along axis 212) and translation of piston 216 out outer cylinder 214 forces rod 196 away from inlet 102 and fluid passage 162 (e.g., in a second direction, opposite the first direction, along axis 212).

With reference to FIG. 4C, in response to a force F being manually applied to rod 196, manual actuation assembly 190 translates to the open position. For example, in response to force F, a first end 230 of rod 196 and flange 220 translate toward biasing member 218, thereby translating piston 216 into outer cylinder 214. Translation of piston 216 into outer cylinder 214 compresses biasing member 218. Compressed biasing member 218 stores mechanical energy and releases the stored energy upon removal of force F. The release of the stored energy causes piston 216 to translate out outer cylinder 214. A rate (i.e., duration of time it takes) to translate rod 196 and plunger 192 from the open position (FIG. 4C) to the closed position (FIGS. 4A and 4B) can be modified by adjusting one or more parameters (e.g. a spring constant) of damper 200. Manual actuation assembly 190 may include a switch 234. Switch 234 is configured to send a switch signal 236 (FIG. 9) to controller 130, in response to manual actuation assembly 190 being translating to the open position. For example, switch 234 may comprise a momentary switch configured to send switch signal 236 in response to force F translating rod 196 a distance greater than a threshold distance along axis 212. The threshold distance may correspond to a maximum distance in which the sealing interface between plunger 192 and wall 205 is maintained. Stated differently, at distances greater than the threshold distance the sealing interface is removed. At distances less than or each to the threshold distance the sealing interface is maintained.

When manual actuation assembly 190 is in the open position, the sealing interface between plunger 192 and wall 205 and/or between wall 205 and seal 204 is removed, thereby allowing water to flow past plunger 192 (e.g., between plunger 192 and wall 205) and into secondary outlet 210. In various embodiments, when manual actuation assembly 190 is in the open position, at least a portion of plunger 192 and/or seal 204 is radially aligned (i.e., overlaps) with fluid passage 162. In this regard, when manual actuation assembly 190 is in the open position, fluid (e.g., water) may flow through inlet 102, into main fluid chamber 164, into fluid passage 162, between wall 205 and plunger 192, and into secondary outlet 210. As described in further detail below, secondary outlet 210 is fluidly coupled to outlet 104 (FIG. 3A) of faucet 100.

Figure 7B:
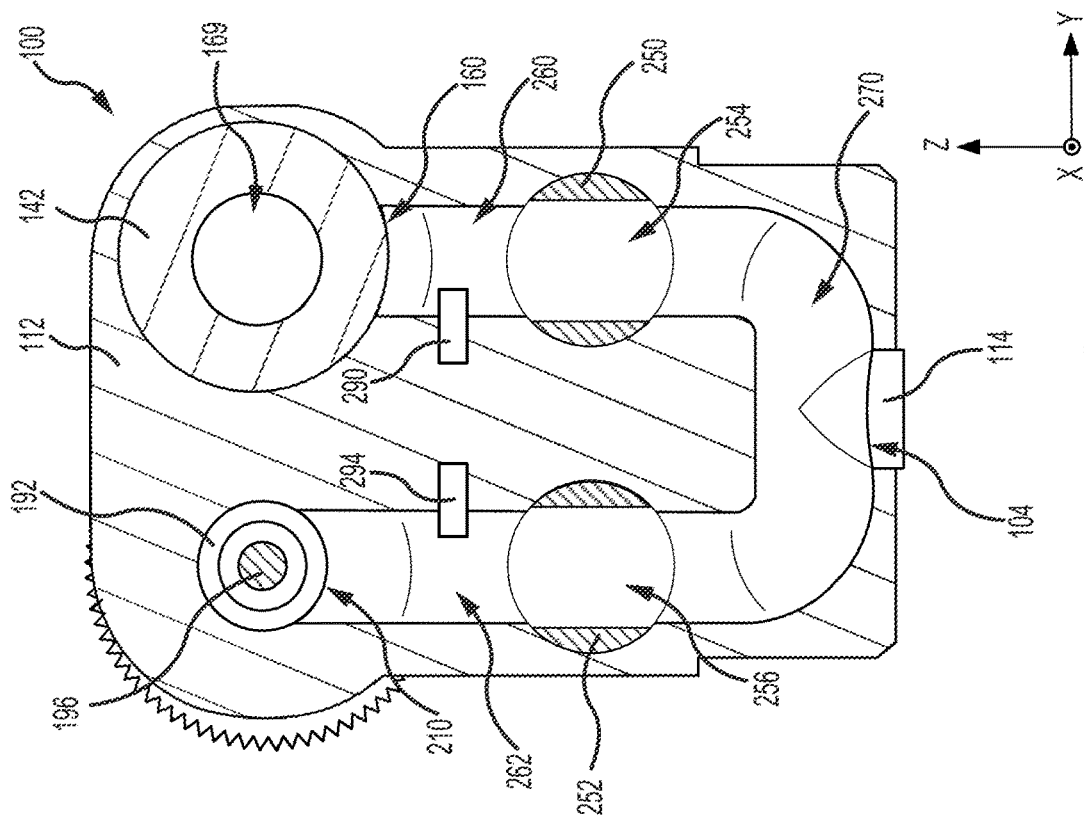
FIGS. 7A and 7B illustrate a front view and a cross section view, respectively, of a touchless faucet having the primary and secondary knob valves in an open state, in accordance with various embodiments.
Figure 7A:
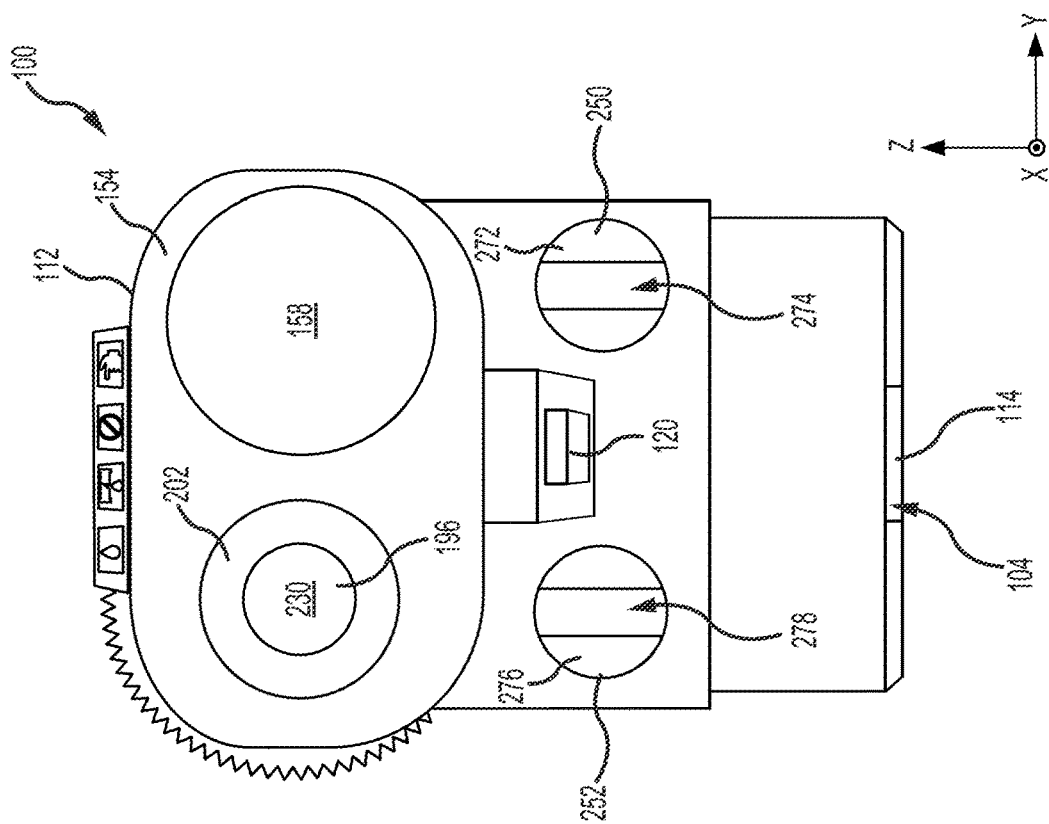

With reference to FIGS. 7A and 7B, a front view and a cross-section view, taken along the line 7A-7A in FIG. 3A, respectively, of faucet 100 are illustrated. In accordance with various embodiments, faucet 100 includes a primary knob valve 250 and a secondary knob valve 252. Primary knob valve 250 is configured to control the flow of fluid from primary outlet 160. Secondary knob valve 252 is configured to control the flow of fluid from secondary outlet 210. In FIGS. 7A and 7B, primary knob valve 250 and secondary knob valve 252 are both in an open state. Primary knob valve 250 defines a primary knob channel 254 (FIG. 7B). Secondary knob valve 252 defines a secondary knob channel 256 (FIG. 7B).

Primary outlet 160 is fluidly connected to a primary outlet channel 260. In this regard, fluid flows through primary outlet 160 and into primary outlet channel 260. Secondary outlet 210 is fluidly connected to a secondary outlet channel 262. In this regard, fluid flows through secondary outlet 210 and into secondary outlet channel 262. When primary knob valve 250 is in the open state, fluid flows from primary outlet 160, through primary outlet channel 260, through primary knob channel 254, and into a main outlet channel 270. When secondary knob valve 252 is in the open state, fluid flows from secondary outlet 210, through secondary outlet channel 262, through secondary knob channel 256, and into main outlet channel 270. In various embodiments, primary outlet channel 260, secondary outlet channel 262, and main outlet channel 270 form a generally U-shaped channel. Main outlet channel 270 is fluidly connected to outlet 104 of faucet 100. In various embodiments, aerator 114 may be located in outlet 104. In this regards, main outlet channel 270 may be fluidly connected to aerator 114.

In various embodiments, a face 272 of primary knob valve 250 may define a primary knob groove 274. Stated differently, primary knob groove 274 may be formed in face 272 of primary knob valve 250. A face 276 of secondary knob valve 252 may define a secondary knob groove 278. Stated differently, secondary knob groove 278 may be formed in face 276 of secondary knob valve 252. Primary knob groove 274 and secondary knob groove 278 allow primary knob valve 250 and secondary knob valve 252, respectively, to be manually rotated from the open state to the closed state. For example, a tool may be inserted into the groove to rotate the knob valve.

With reference to FIGS. 8A and 8B, a front view and a cross-section view, taken along the line 7A-7A in FIG. 3A, respectively, of faucet 100 are illustrated with primary knob valve 250 and secondary knob valve 252 in a closed state. In the closed state, primary knob valve 250 blocks, or otherwise prevents, fluid in primary outlet channel 260 from flowing into main outlet channel 270. In the closed state, secondary knob valve 252 blocks, or otherwise prevents, fluid in secondary outlet channel 262 from flowing into main outlet channel 270.

With combined reference to FIGS. 3B, 7B, and 8B, in various embodiments, a primary knob actuator 280 may be rotationally coupled to primary knob valve 250. A secondary knob actuator 282 may be rotationally coupled to secondary knob valve 252. In this regard, primary knob actuator 280 may be configured to rotate primary knob valve 250 between the open state and the closed state, and secondary knob actuator 282 may be configured to rotate secondary knob valve 252 between the open state and the closed state.

Controller 130 may send commands to primary knob actuator 280 based, at least, in part on water presence signals received from a primary outlet water presence sensor 290. Primary outlet water presence sensor 290 may be located in primary outlet channel 260. Primary outlet water presence sensor 290 is configured to detect a presence of water in primary outlet channel 260. Stated differently, primary outlet water presence sensor 290 may detect if water is present between primary outlet 160 and primary knob valve 250. Primary outlet water presence sensor 290 outputs primary outlet water presence signals 292 (FIG. 9) to controller 130. Primary outlet water presence signals 292 may be sent via a wired or wireless connection to controller 130.

Controller 130 may send commands to secondary knob actuator 282 based, at least, in part on water presence signals received from a secondary outlet water presence sensor 294. Secondary outlet water presence sensor 294 may be located in secondary outlet channel 262. Secondary outlet water presence sensor 294 is configured to detect a presence of water in secondary outlet channel 262. Stated differently, secondary outlet water presence sensor 294 may detect if water is present between secondary outlet 210 and secondary knob valve 252. Secondary outlet water presence sensor 294 outputs secondary outlet water presence signals 296 (FIG. 9) to controller 130. Secondary outlet water presence signals 296 may be sent via a wired or wireless connection to controller 130.

Figure 9:
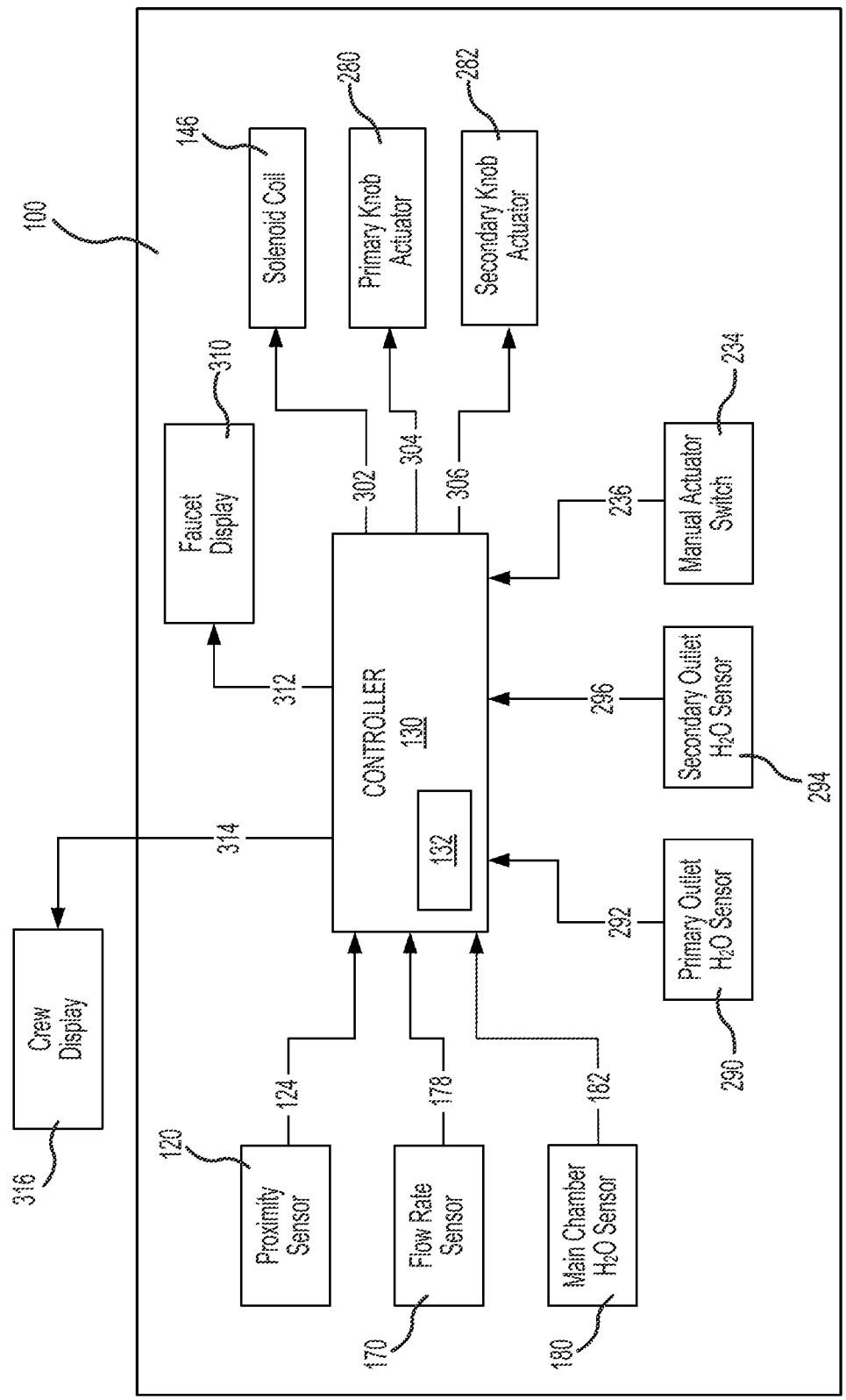
FIG. 9 illustrates a schematic view of a touchless faucet, in accordance with various embodiments.

With reference to FIG. 9, a schematic of faucet 100 is illustrated. In accordance with various embodiments, controller 130 is operably coupled to proximity sensor 120, flow rate sensor 170, main chamber water presence sensor 180, primary outlet water presence sensor 290, and secondary outlet water presence sensor 294. Controller 130 receives target detection signals 124 from proximity sensor 120. In this regard, controller 130 may determine an object is located under outlet 104 (FIG. 3B) based on target detection signals 124. Controller 130 receives flow rate signals 178 from flow rate sensor 170. In this regard, controller 130 may determine a flow rate of fluid through main fluid chamber 164 (e.g., between inlet 102 and fluid passage 162 in FIG. 4A) based on flow rate signals 178.

Controller 130 receives target detection signals 124 from proximity sensor 120. In this regard, controller 130 is configured to determine if an object is located under outlet 104 (FIG. 3B) based on target detection signals 124. Controller 130 receives flow rate signals 178 from flow rate sensor 170. In this regard, controller 130 is configured to determine a flow rate of fluid through main fluid chamber 164 (e.g., between inlet 102 and fluid passage 162 in FIG. 4A) based on flow rate signals 178.

Controller 130 receives main chamber water presence signals 182 from main chamber water presence sensor 180. Controller 130 is configured to determine if fluid (e.g., water) is located in main fluid chamber 164 (e.g., between inlet 102 and fluid passage 162 in FIG. 4A) based on main chamber water presence signals 182.

Controller 130 receives primary outlet water presence signals 292 from primary outlet water presence sensor 290. Controller 130 is configured to determine if fluid (e.g., water) is present in primary outlet channel 260 (e.g., between primary outlet 160 and primary knob valve 250 in FIG. 7B) based on primary outlet water presence signals 292. Controller 130 receives secondary outlet water presence signals 296 from secondary outlet water presence sensor 294. Controller 130 is configured to determine if fluid (e.g., water) is present in secondary outlet channel 262 (e.g., between secondary outlet 210 and secondary knob valve 252 in FIG. 7B) based on secondary outlet water presence signals 296.

Controller 130 receives switch signals 236 from switch 234. Controller 130 is configured to determine if manual actuation assembly 190 has been actuated (e.g., forced) to the open position based on switch signals 236.

In accordance with various embodiments, controller 130 is configured to send actuation commands 302 to solenoid coil 144 based on one or more of signals 124, 178, 182, 236, 292, and/or 296. Actuation commands 302 are configured to increase or decrease a current supplied to solenoid coil 144. Controller 130 is configured to send actuation commands 304 to primary knob actuator 280 based on one or more of signals 124, 178, 182, 236, 292, and/or 296. Actuation commands 304 are configured to cause primary knob actuator 280 to rotate primary knob valve 250 (FIG. 7A) between the open state and the closed state. Controller 130 is configured to send actuation commands 306 to secondary knob actuator 282 based on one or more of signals 124, 178, 182, 236, 292, and/or 296. Actuation commands 306 are configured to cause secondary knob actuator 282 to rotate secondary knob valve 252 (FIG. 7A) between the open state and the closed state.

In accordance with various embodiments, faucet 100 may include a faucet display 310. As described in further detail below, faucet display 310 may be configured to convey a status (or health) of faucet 100 to users. Controller 130 is configured to send commands 312 to faucet display 310 based on one or more of signals 124, 178, 182, 236, 292, and/or 296 and/or on one or more commands 302, 304, and/or 306.

In accordance with various embodiments, controller 130 may be configured to send commands 314 to a crew display 316. Crew display may be configured to convey a status (or health) of faucet 100 and/or of the aircraft potable water system to crew of aircraft 10. Crew display 316 may be located in a galley or other area of aircraft 10 that is accessible to crew and/or maintenance personnel. Controller 130 may be configured to send commands 314 based on one or more of signals 124, 178, 182, 236, 292, and/or 296 and/or on one or more commands 302, 304, and/or 306.

Figure 10A:
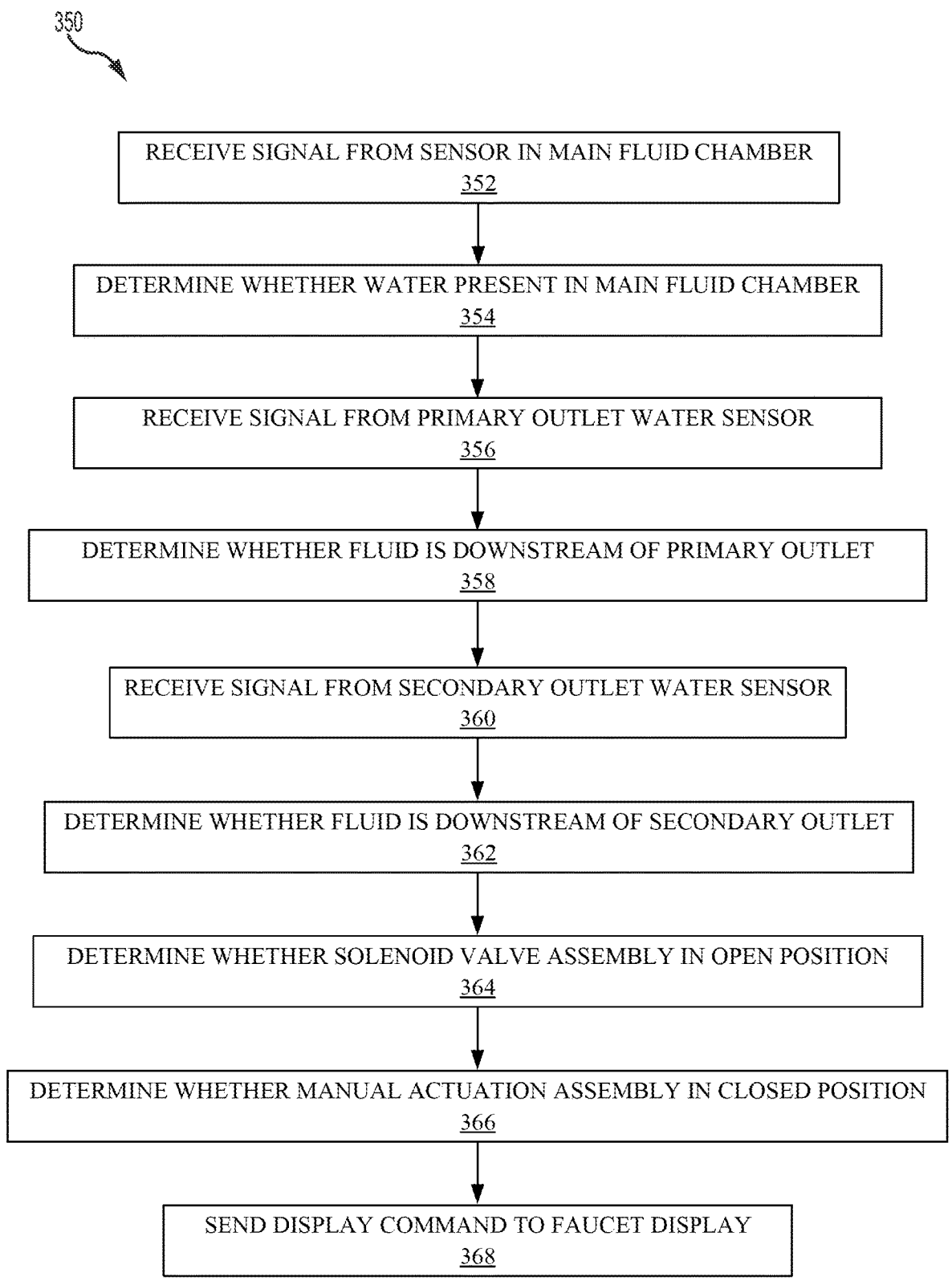
FIGS. 10A and 10B illustrate a process for controlling a touchless faucet, in accordance with various embodiments.

With reference to FIG. 10A, a process 350 for controlling a touchless faucet is illustrated. Process 350 may be carried out by controller 130, with momentary reference to FIG. 3A, on touchless faucet 100. In accordance with various embodiments, process 350 may include receiving a first signal from a sensor located in a main chamber define by a faucet housing of the touchless faucet (step 352) and determining whether water is present in the main fluid chamber based on the first signal (step 354). With combined reference to FIG. 10A and FIG. 9, step 352 may include controller 130 receiving at least one of flow rate signal 178 from flow rate sensor 170 or main chamber water presence signal 182 from main chamber water presence sensor 180. Step 354 may include controller 130 determining whether water is present in main fluid chamber 164 based on the flow rate signal 178 and/or the main chamber water presence signal 182.

With continuing reference to FIG. 10A, process 350 may further include receiving a second signal from a second sensor located downstream of a primary outlet defined by the faucet housing (step 356), determining whether water is present downstream of the secondary outlet (step 358), receiving a third signal from a third sensor located downstream of a secondary outlet defined by the faucet housing (step 360), and determining whether water is present downstream of the secondary outlet (step 362).

With combined reference to FIG. 10A, FIG. 4B, and FIG. 9 and step 356 may include controller 130 receiving primary outlet water presence signal 292 from primary outlet water presence sensor 290. Step 358 may include controller 130 determining if water is present downstream of primary outlet 160 based on primary outlet water presence signal 292. Step 358 may include controller 130 receiving secondary outlet water presence signal 296 from secondary outlet water presence sensor 294. Step 362 may include determining if water is present downstream of secondary outlet 210 based on secondary outlet water presence signal 296.

With continuing reference to FIG. 10A, in various embodiments, process 350 may further include determining whether an electrically controller valve assembly located in the faucet housing should be in an open position (step 364), determining if a manual actuation assembly located in the faucet housing should be in a closed position (step 366), and sending a display command to a display of the touchless faucet (step 368).

With combined reference to FIG. 10A, FIG. 4B and FIG. 9, in accordance with various embodiments, step 364 may include controller 130 determining whether solenoid valve assembly 140 is the open position. Step 366 may include controller 130 determining whether manual actuation assembly 190 is the closed position.

Controller 130 may determine whether solenoid valve assembly 140 should be in the open position, in response to determining that water is present downstream of primary outlet 160 (e.g., if primary outlet water presence signal 292 from primary outlet water presence sensor 290 indicates water is detected). In various embodiments, controller 130 is configured to determine if manual actuation assembly 190 is the open position in response to controller 130 determining water is present downstream of secondary outlet 210 (e.g., if secondary outlet water presence signal 296 from secondary outlet water presence sensor 294 indicates water is detected).

Figure 10B:
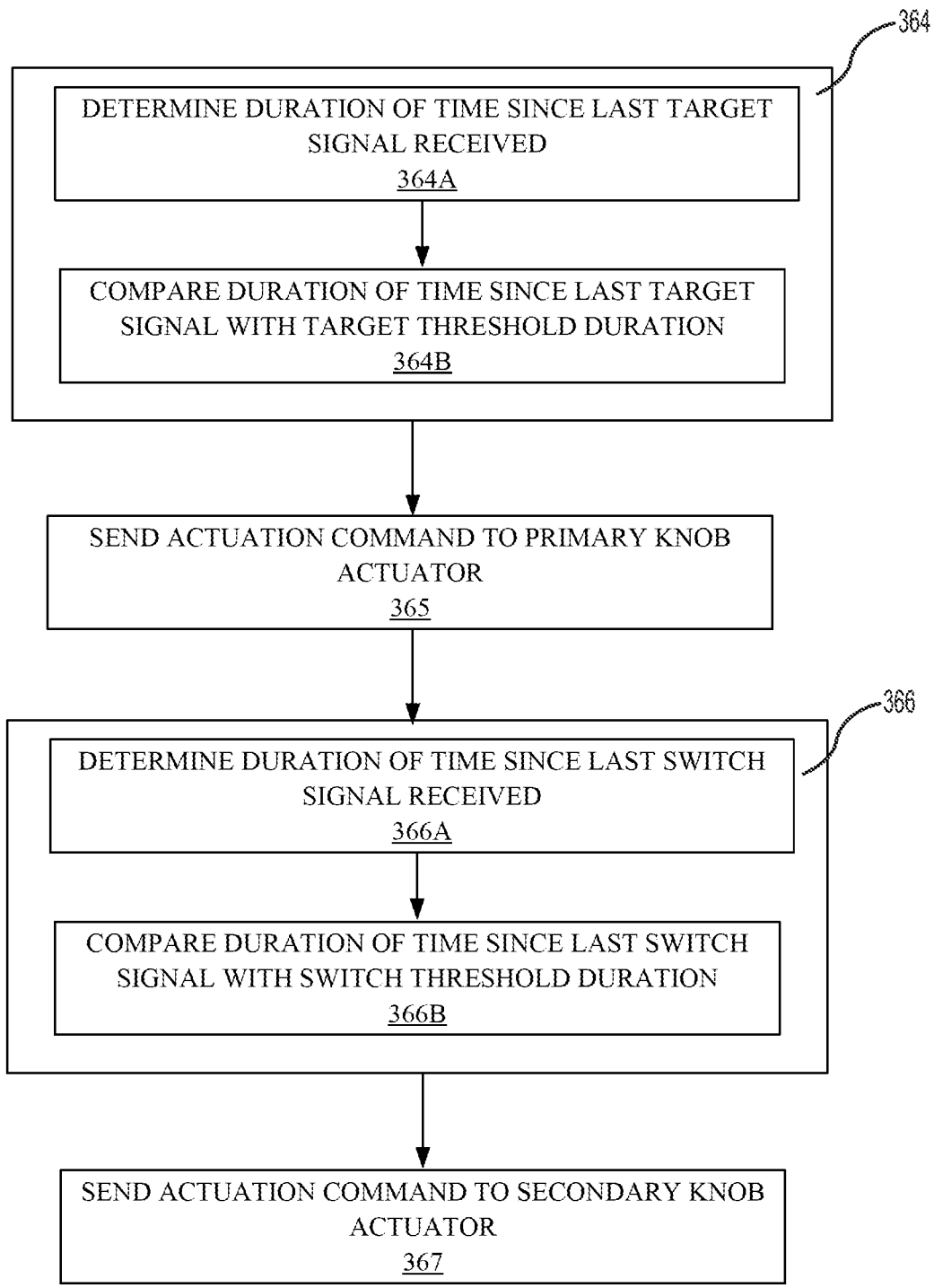

With reference to FIG. 10B, in various embodiments, step 364 may include determining a first duration of time since the controller last received a target signal from a proximity sensor (step 364A) and comparing the first duration of time since the controller last received the target signal to a target signal threshold duration (step 364B). Step 366 may include determining a second duration of time since the controller last received a switch from a momentary switch of the manual actuation assembly (step 366A) and comparing the second duration of time since the controller last received the switch signal to a switch signal threshold duration (step 366B).

In various embodiments, process 350 may further include sending a first actuation command to a primary knob actuator if the controller determines that water is present downstream of the primary outlet and that the first duration of time is greater than the target signal threshold duration (step 365) and sending a second actuation command to a secondary knob actuator if the controller determines that water is present downstream of the secondary outlet and that the second duration of time is greater than the switch signal threshold duration (step 367). The first actuation command is configured to cause the primary knob actuator to rotate a primary knob valve of the touchless faucet to a closed state. The second actuation command is configured to cause the secondary knob actuator to rotate a secondary knob valve of the touchless faucet to the closed state.

With combined reference to FIG. 10B, FIG. 9, and FIG. 4B, in various embodiments, step 364A may include controller 130 determining a duration of time since controller 130 last received a target signal 124 from proximity sensor 120. Step 364B may include controller 130 comparing the duration of time since controller 130 last received a target signal 124 to a threshold time. For example, if controller 130 is configured to actuate solenoid valve assembly 140 to the open position for 15 seconds (e.g., for a target threshold duration) each time a target signal 124 is received from proximity sensor 120 and it has been ten (10) seconds since the last target signal 124 was received, then controller 130 determines solenoid valve assembly 140 should be in the open position. However, if it has been greater than fifteen (15) second since the last target signal 124 was received, then controller 130 determines solenoid valve assembly 140 should be in the closed position.

In various embodiments, step 366A may include controller 130 determining a duration of time since controller 130 last a switch signal 236 from manual actuator switch 234. Step 366B may include controller 130 comparing the duration of time since the last switch signal 236 was received to a switch threshold duration. For example, if damper 200 is configured to actuate plunger 192 to the closed position within 15 seconds (e.g., a switch threshold duration) of damper 200 being fully compressed and it has been ten (10) seconds since the last switch signal 236 was received, then controller 130 determines manual actuation assembly 190 may be in the open position (e.g., if damper 200 is partially compressed, switch signal 236 may be sent, but it may not take the full 15 seconds for plunger 192 to translate to the closed position). However, if it has been greater than ten seconds since the last switch signal 236 was received, then controller 130 determines manual actuation assembly 190 should be in the closed position.

In various embodiments, step 365 may include controller 130 sending actuation command 304 to primary knob actuator 280. Step 367 may include controller 130 sending actuation command 306 to secondary knob actuator 382. Controller 130 may send actuation command 304 in response to determining that water is present downstream of primary outlet 160 and that the duration of time since the last target signal 124 was received is greater than the target signal threshold duration (i.e., in response to determining that solenoid valve assembly 140 should not be in the open position). Controller 130 may send actuation command 306 in response to determining that water is present downstream of secondary outlet 210 and that the duration of time since the last switch signal 236 was received is greater than the switch signal threshold duration (i.e., in response to determining that manual actuation assembly be should not be in the closed position).

Returning FIG. 10A and FIG. 9, step 368 may include controller 130 sending a command 312 to faucet display 310. With combined reference to FIG. 10A and FIG. 11, in various embodiments, if controller 130 determines faucet 100 is functioning properly, controller 130 commands faucet display 310 to illuminate a first icon 370. First icon 370 may be configured to convey to a user that faucet 100 is working properly and both touchless and manual actuation are available. If controller 130 determines no water is present in main fluid chamber 164, controller 130 may command faucet display 310 to illuminate a second icon 372. The second icon 372 may be configured to convey to users that faucet 100 is out of order and cannot be used at the present time. Controller 130 may command faucet display 310 to illuminate second icon 372 if both primary knob valve 250 and secondary knob valve 252 are in the closed state.

If controller 130 determines there is a leak, controller 130 may command faucet display 310 to illuminate a third icon 374. The third icon 374 may be configured to convey to users or maintenance personnel that faucet 100 is not working properly and should be scheduled for maintenance. Controller 130 may determine there is a leak if water is detected downstream of primary outlet 160, but solenoid valve assembly 140 should be in a closed state. Controller 130 may determine there is a leak if water is detected downstream of secondary outlet 210, but manual actuation assembly 190 should be closed. Controller 130 may determine there is a leak upstream of primary outlet 160 if controller 130 determines water is present in main fluid chamber 164, solenoid valve assembly 140 should open, and manual actuation assembly 190 should be closed, but water is not detected downstream of primary outlet 160. Similarly, controller 130 may determine there is a leak upstream of secondary outlet 210 if controller 130 determines water is present in main fluid chamber 164, solenoid valve assembly 140 should closed, and manual actuation assembly 190 should be open, but water is not detected downstream of secondary outlet 210.

Figure 11:
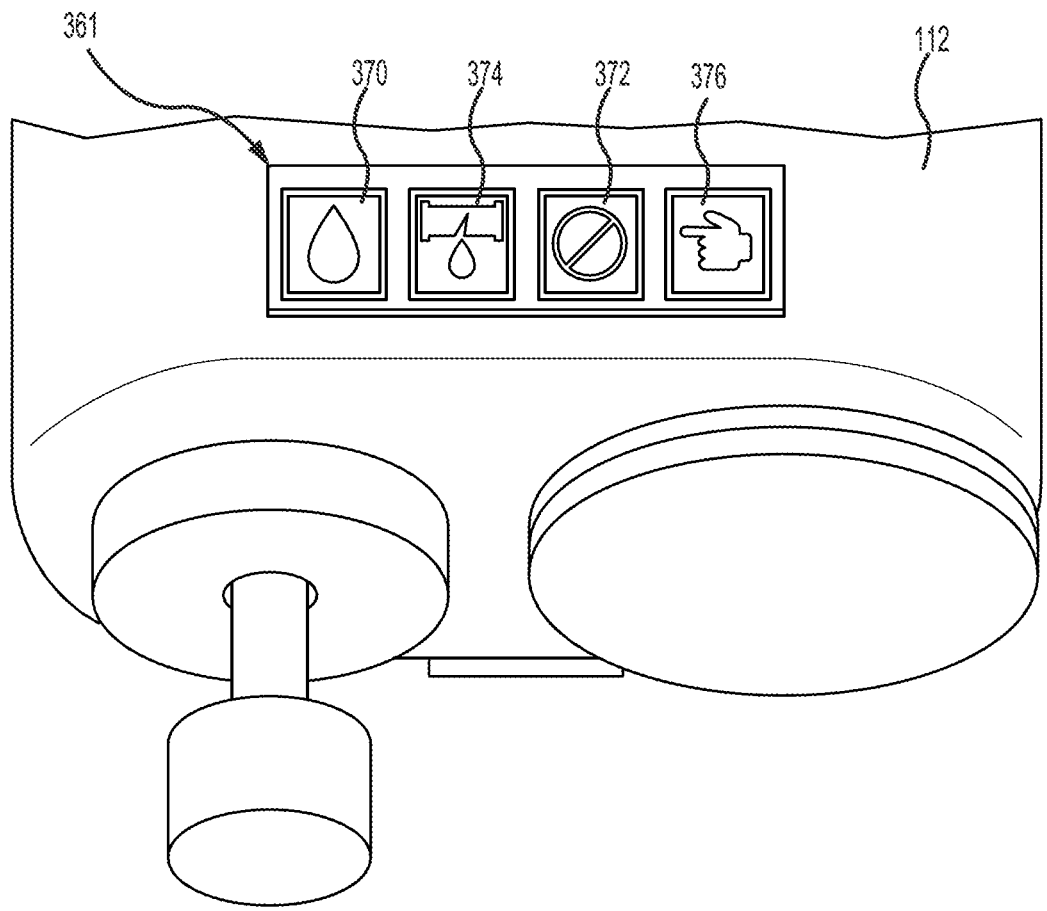
FIG. 11 illustrates a display of a touchless faucet, in accordance with various embodiments.

If controller 130 determines solenoid valve assembly 140 is not functioning properly, controller 130 may command faucet display 310 to illuminate a fourth icon 376. The fourth icon 376 may be configured to convey to users that the touchless system (e.g., solenoid valve assembly 140) is not functioning properly and faucet 100 needs to be operated manually. For example, if water is detected by primary outlet water presence sensor 290 when solenoid valve assembly 140 should be closed, controller 130 may command primary knob actuator 280 to rotate primary knob valve 250 to the closed state. Controller 130 may then command faucet display 310 to illuminate fourth icon 376. If water is not detected by primary outlet water presence sensor 290 when solenoid valve assembly 140 should be open, controller 130 may command primary knob actuator 280 to rotate primary knob valve 250 to the closed state and command faucet display 310 to illuminate fourth icon 376. The first, second, third, and fourth icons 370, 372, 374, 376 shown in FIG. 11 are exemplary icons. Faucet display 310 may include any suitable icon. In this regard, controller 130 may be configured to cause faucet display 310 to display any symbol, image, words, phrases, colored lights, output an audio warning or any other output configured to convey a status of faucet 100 to a user. Controller 130 may send similar fault alerts and health status updates to crew display 316, with momentary reference to FIG. 9.

Figures 12A, 12B:
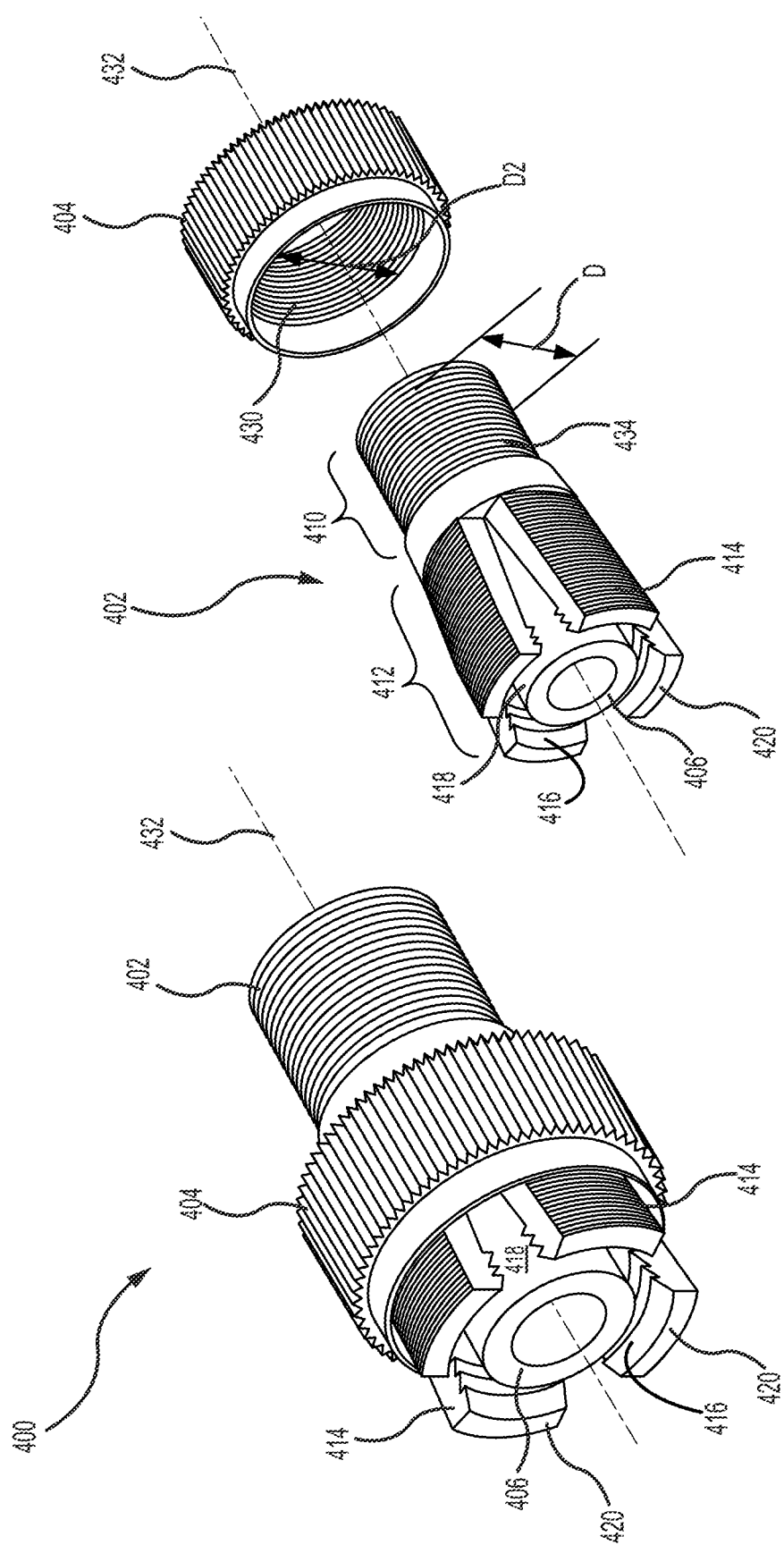
FIGS. 12A and 12B illustrate a clamping coupler for a touchless faucet, in accordance with various embodiments.

With reference to FIGS. 12A and 12B, a clamping coupler 400 for a touchless faucet is illustrated. In various embodiments, faucet 100 may include clamping coupler 400 in place of coupler 110. Clamping coupler 400 includer a central body 402 and a nut 404. A conduit 406 may be located in central body 402. A first portion 410 of central body 402 includes an annular shape having a diameter D. Diameter D may be generally constant along first portion 410. As used herein "generally" constant is meant to include the slight variations in diameter D caused by the outer circumferential surface of first portion 410 being threaded.

Central body 402 further includes a second portion 412. Second portion 412 includes radially outward extending (or slanted) flanges 414. Flanges 414 are oriented such that a distance between an inner circumferential surface 416 of flanges 414 and the outer circumferential surface 418 of conduit 406 increases toward a terminal end 420 of flanges 414. Terminal ends 420 are opposite first portion 410.

In accordance with various embodiments, nut 404 include an inner threaded surface 430. As nut 404 rotates about nut axis 432 and translates axially toward terminal end 420 of flanges 414, the inner diameter D2 of nut 404 forces flanges 414 radially inward toward conduit 406.

Figure 12C:
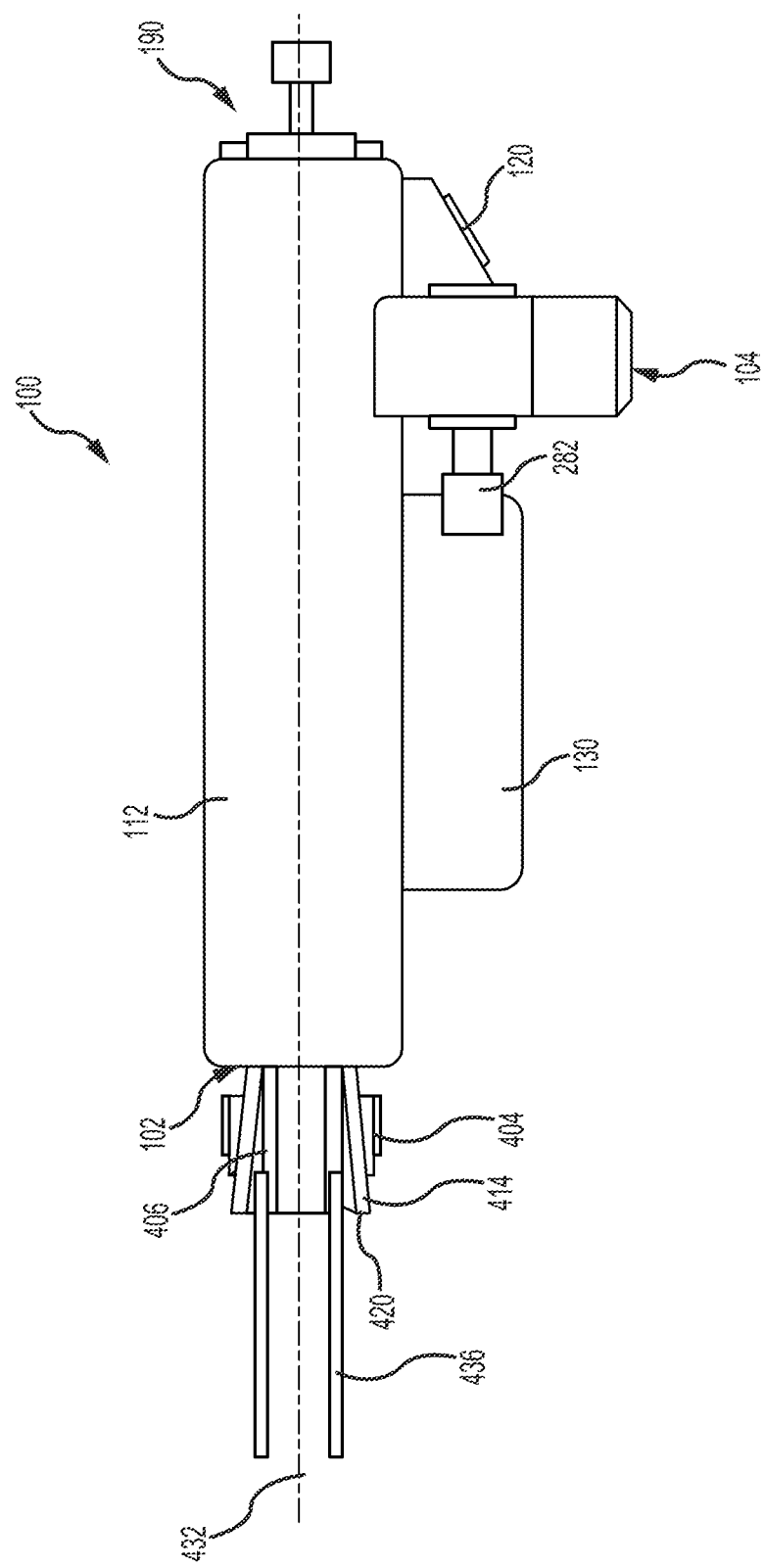
FIG. 12C illustrates a clamping coupler fluidly coupling a potable water supply line fluid to a touchless faucet, in accordance with various embodiments.

With reference to FIG. 12C, and continuing reference to FIGS. 12A and 12B, clamping coupler 400 may be coupled to faucet housing 112 via a threaded engagement between a threaded outer circumferential surface 434 of first portion 410 of central body 402 and threaded surface 113 (FIG. 4A) of faucet housing 112. A potable water supply line 436 (e.g., a conduit fluidly connect to potable water source 106 (FIG. 1)) may be locate around conduit 406, such that potable water supply line 436 is located radially between conduit 406 and flanges 414. As nut 404 is translated axially toward terminal end 420 of flanges 414, potable water supply line 436 may be clamped between flanges 414 and conduit 406. In this regard, the pressure applied to potable water supply line 436 by flanges 414 prevents potable water supply line 436 from translating axially away from conduit 406, thereby coupling potable water supply line 436 to inlet 102. Clamping coupler 400 may allow faucet 100 to be coupled to potable water supply lines that do not include a threaded surface.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A touchless faucet, comprising:
   a faucet housing defining an inlet;
   a main fluid chamber defined by the faucet housing;
   a solenoid valve assembly located in a solenoid chamber, wherein the solenoid chamber is located in a first portion of the faucet housing;
   a primary outlet formed in the first portion of the faucet housing, wherein the solenoid valve assembly is configured to control a flow of fluid to the primary outlet;
   a manual actuation assembly located in a second portion of the faucet housing and further comprising:
      a plunger biased toward a front end of the touchless faucet, and
      a damper assembly operably coupled to the plunger; and
   a secondary outlet formed in the second portion of the faucet housing, wherein the manual actuation assembly is configured to control the flow of fluid to the secondary outlet.

2. The touchless faucet of claim 1, wherein the solenoid valve assembly comprises:
   a poppet configured to translate along a longitudinal poppet axis;
   a biassing member configured to bias the poppet toward the primary outlet; and
   a solenoid coil configured to generate a magnetic field.

3. The touchless faucet of claim 2, wherein the poppet defines a fluid channel.

4. The touchless faucet of claim 3, wherein when the solenoid valve assembly is in an open position, the fluid channel defined by the poppet fluidly connects the main fluid chamber and the primary outlet.

5. The touchless faucet of claim 4, wherein the faucet housing defines a fluid passageway fluidly connecting the main fluid chamber and the solenoid chamber, and wherein when the solenoid valve assembly is in the open position, an inlet of the fluid channel defined by the poppet aligns with an outlet of the fluid passageway.

6. The touchless faucet of claim 1, wherein when the manual actuation assembly is in a closed position, the plunger forms a sealing interface with a wall of the faucet housing.

7. The touchless faucet of claim 1, wherein when the manual actuation assembly is in an open position, the plunger overlaps a fluid passageway fluidly connecting the main fluid chamber and the solenoid chamber.

8. The touchless faucet of claim 1, further comprising at least one of a flow rate sensor or a water presence sensor located in the main fluid chamber.

9. The touchless faucet of claim 1, further comprising:
   a primary outlet water presence sensor located downstream of the primary outlet; and
   a secondary outlet water presence sensor located downstream of the secondary outlet.

10. The touchless faucet of claim 9, further comprising:
    a primary knob valve located downstream of the primary outlet water presence sensor, the primary knob valve being configured to control the flow of fluid between the primary outlet and a main outlet chamber; and
    a secondary knob valve located downstream of the secondary outlet water presence sensor, the secondary knob valve being configured to control the flow of fluid between the secondary outlet and the main outlet chamber.

11. A touchless faucet, comprising:
    a faucet housing;
    a solenoid valve assembly located in the faucet housing;
    a primary outlet formed in a first portion of the faucet housing, wherein the solenoid valve assembly is configured to control a flow of fluid to the primary outlet;
    a primary valve channel fluidly connected to the primary outlet;
    a manual actuation assembly located in the faucet housing;
    a secondary outlet formed in a second portion of the faucet housing, wherein the manual actuation assembly is configured to control the flow of fluid to the secondary outlet;
    a secondary valve channel fluidly connected to the secondary outlet;
    a main outlet channel downstream of the primary valve channel and the secondary valve channel;
    a primary knob valve located between the primary outlet and the main outlet channel; and
    a secondary knob valve located between the secondary outlet and the main outlet channel.

12. The touchless faucet of claim 11, further comprising:
    a primary actuator rotationally coupled to the primary knob valve;
    a secondary actuator rotationally coupled to the secondary knob valve.

13. The touchless faucet of claim 11, further comprising:
    a primary outlet water presence sensor located downstream of the primary outlet; and
    a secondary outlet water presence sensor located downstream of the secondary outlet.

14. A touchless faucet for an aircraft lavatory, the touchless faucet comprising:
    a faucet housing;
    an electrically controlled valve assembly located in the faucet housing, the electrically controlled valve assembly being configured to control a flow of fluid to a primary outlet of the faucet housing;
    a manual actuation assembly located in the faucet housing, the manual actuation assembly being configured to control the flow of fluid to a secondary outlet of the faucet housing; and
    a clamping coupler coupled to an inlet of the faucet housing, the clamping coupler comprising:
       a central body having a plurality of flanges;
       a conduit located within the central body, wherein a distance between the conduit and flanges increases toward a terminal end of the flanges; and
       a nut configured to form a threaded engagement with the plurality of flanges, wherein translation of the nut toward the terminal end of the plurality of flanges forces the plurality of flanges radially inward and toward the conduit.

15. The touchless faucet of claim 14, wherein the electrically controlled valve assembly comprises a solenoid valve assembly, and wherein the manual actuation assembly includes a plunger biased toward a front end of the touchless faucet, and a damper assembly operably coupled to the plunger.

* * * * *